United States Patent
Li et al.

(10) Patent No.: US 7,979,317 B2
(45) Date of Patent: Jul. 12, 2011

(54) METHOD AND SYSTEM FOR SUBSCRIBING A PURCHASE ITEM IN MOBILE BROADCAST MULTICAST SERVICE

(75) Inventors: Zhibin Li, Shenzhen (CN); Zhuo Sang, Shenzhen (CN); Qinwei Zhang, Shenzhen (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 840 days.

(21) Appl. No.: 11/998,565

(22) Filed: Nov. 30, 2007

(65) Prior Publication Data

US 2008/0126222 A1    May 29, 2008

Related U.S. Application Data

(63) Continuation of application No. PCT/CN2007/000479, filed on Feb. 12, 2007.

(30) Foreign Application Priority Data

Feb. 22, 2006    (CN) .......................... 2006 1 0024059

(51) Int. Cl.
  *G06Q 30/00* (2006.01)
  *G06F 17/30* (2006.01)
(52) U.S. Cl. ..................................................... 705/26.1
(58) Field of Classification Search ............ 705/26–27.2
  See application file for complete search history.

(56) References Cited

U.S. PATENT DOCUMENTS

| | | | |
|---|---|---|---|
| 5,819,160 A | 10/1998 | Foladare et al. | |
| 7,263,384 B2 * | 8/2007 | Sato et al. | 455/560 |
| 7,672,280 B2 * | 3/2010 | Shim et al. | 370/338 |
| 2004/0223513 A1 * | 11/2004 | Meago | 370/468 |

(Continued)

FOREIGN PATENT DOCUMENTS

WO    00/64177    10/2000

(Continued)

OTHER PUBLICATIONS

MBMS service provision and its challenges. (2003). In Fourth International Conference on 3G Mobile Communication Technologies (3G 2003) (IEE Conf. Publ.No. 494). London: IEEE [recovered from Dialog on May 2, 2011].*

(Continued)

*Primary Examiner* — Will Allen
*Assistant Examiner* — Kathleen Davison
(74) *Attorney, Agent, or Firm* — Slater & Matsil, L.L.P.

(57) ABSTRACT

The present invention relates to Mobile Broadcast Multicast technologies, and discloses a method for subscribing a purchase item in Mobile Broadcast Multicast Service, so that the subscription operation and update operation of the purchase item in BCAST are simplified, and the utilization of system resources is improved. In the present invention, a subscription management module generates a PurchaseItem identification, and sends this identification to a service distribution and adaptation module. Therefore, the PurchaseItem identification may be included in a PurchaseItem fragment sent to a user terminal from the service distribution and adaptation module. And, the function of identifying the purchase item is separated from the PurchaseItem fragment identification. Through sending a service request including the PurchaseItem identification to the subscription management module by the user terminal, the subscription of the purchase item is accomplished. The subscription management module manages service information of the purchase item based on the PurchaseItem identification. A device for implementing the above method is also disclosed in the present invention.

6 Claims, 4 Drawing Sheets

U.S. PATENT DOCUMENTS

| | | | |
|---|---|---|---|
| 2005/0008159 A1* | 1/2005 | Grilli et al. | 380/270 |
| 2005/0281270 A1* | 12/2005 | Kossi et al. | 370/395.5 |
| 2006/0030312 A1 | 2/2006 | Han et al. | |
| 2006/0092902 A1* | 5/2006 | Schmidt | 370/342 |
| 2006/0140411 A1* | 6/2006 | Zhu | 380/277 |
| 2006/0206708 A1* | 9/2006 | Son et al. | 713/163 |
| 2006/0248211 A1 | 11/2006 | Hwang et al. | |
| 2006/0276183 A1 | 12/2006 | Quick, Jr. et al. | |
| 2007/0055786 A1* | 3/2007 | Pohjolainen et al. | 709/230 |
| 2007/0168534 A1* | 7/2007 | Hiltunen et al. | 709/230 |

FOREIGN PATENT DOCUMENTS

| | | |
|---|---|---|
| WO | 2004/105300 A2 | 12/2004 |
| WO | 2004/105300 A2 | 12/2004 |
| WO | 2006/014076 A1 | 2/2006 |
| WO | 2007/052989 A1 | 5/2007 |

OTHER PUBLICATIONS

Service Guide for Mobile Broadcast Services, Draft Version 1.0—Aug 5, 2005.

Written Opinion Mailed May 31, 2007 in PCT Application PCT/CN2007/000479.

* cited by examiner

METHOD AND SYSTEM FOR SUBSCRIBING A PURCHASE ITEM IN MOBILE BROADCAST MULTICAST SERVICE

This application is a continuation application to PCT application No. PCT/CN2007/000479, filed Feb. 12, 2007, which claims a priority from the Chinese Patent Application No. 200610024059.X, filed with the Chinese Patent Office on Feb. 22, 2006, entitled "METHOD FOR SUBSCRIBING PURCHASE ITEM IN MOBILE BROADCAST MULTICAST SERVICE", contents of which are incorporated herein by reference in its entirety.

FIELD OF THE INVENTION

The present invention relates to mobile broadcast multicast technologies, in particular to a method and device for subscribing a purchase item in mobile broadcast multicast service.

BACKGROUND OF THE INVENTION

With the rapid development of last few decades, more and more people have benefited from mobile communication, but main services provided by mobile communication are still services of telephone and message. With the rapid development of Internet, a large amount of multimedia services emerge concurrently. Obviously, the multimedia services are also required to be supported by mobile communication. Some multimedia service applications provided by Internet, such as mobile video, video broadcast, video conference, education online, and interactive game, require multiple users to receive same data simultaneously. Meanwhile, the mobile video has become a hottest topic in China. In view of conditions of the present applications, methods of implementing of the mobile video are mainly categorized as follows. The first method is a method based on terrestrial broadcast, which includes Digital Video Broadcasting-Handheld (abbreviated as "DVB-H") technique in Europe, Terrestrial-Digital Multimedia Broadcasting (abbreviated as "T-DMB") technique in Korea, and MediaFLO technique recommended by Qualcomm of America, etc. The second method is a method based on satellite propagation, which includes Satellite Digital Multimedia Broadcasting (abbreviated as "SDMB") technique of Europe. The third method is a method based on mobile network, which includes Multimedia Broadcast/Multicast Service (abbreviated as "MBMS") technique, Broadcast Multicast Service (abbreviated as "BCMCS") technique, and stream media technique in the $3^{rd}$ Generation Partnership Project (abbreviated as "3GPP"). Furthermore, there is another important technique, Mobile Broadcast Multicast Service (abbreviated as "BCAST") standard, which is irrelevant to the Bearer network, and proposed by Open Mobile Alliance (abbreviated as "OMA").

Among the techniques described above, the MBMS and the BCMCS are to provide point-to-multipoint service in the mobile network where data is sent from a data source to multiple users, in order to efficiently utilize resources of the mobile network. The MBMS service is transmitted between the Universal Mobile Telecommunications System (UMTS) Terrestrial Radio Access Network (abbreviated as "UTRAN") and the user terminal in two transmission modes: point-to-multipoint and point-to-point. In the point-to-multipoint mode, same data is sent through a MBMS Point-to-Multipoint Traffic Channel (abbreviated as "MTCH") Logic Channel, and can be received by all the user terminals which have joined in the multicast service or are interested in the broadcast service. In the point-to-point mode, data is sent through a dedicated service channel, and only received by one user terminal corresponding to the dedicated service channel. However, in the DVB-H technique, plural video channels and audio channels can be simultaneously transmitted to mobile terminals, for the purpose of solving existed problems of power consumption, performance in mobile environment, and flexibility in network design when the digital video broadcasting service is provided to the mobile terminal. In addition, the most important advantage of the DVB-H technique is to provide a business pattern oriented to a horizontal market, with which the content, service, and network layer are divided, and the content provider, broadcast service provider, broadcast network Carrier, mobile network Operator and terminal supplier of the whole industrial chain are enabled to be independent relatively from one another, each of which can dedicate to its own special field and benefit therefrom.

Figure 1:
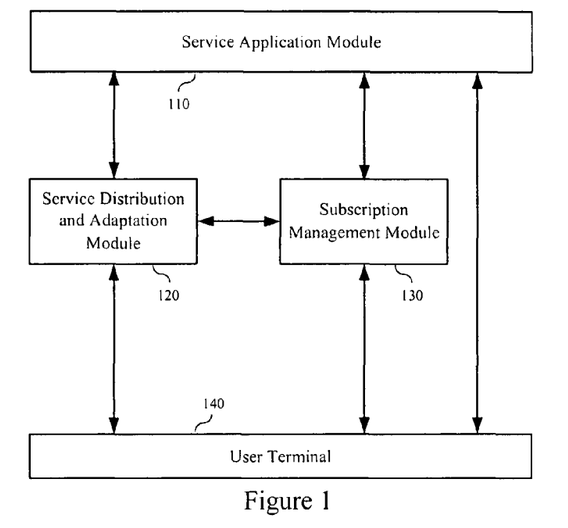
FIG. 1 is a structural diagram of the BCAST system in the prior art.

These three techniques are all based on the service layer in the mobile network hierarchical structure. However, those service layers in the three different hierarchical structures of mobile networks described above are converged in the BCAST, thus providing a uniform service platform for users. The hierarchical structure includes a service application module 110, a service distribution and adaptation module 120, a subscription management module 130, and a user terminal 140, as shown in FIG. 1.

Figure 2:
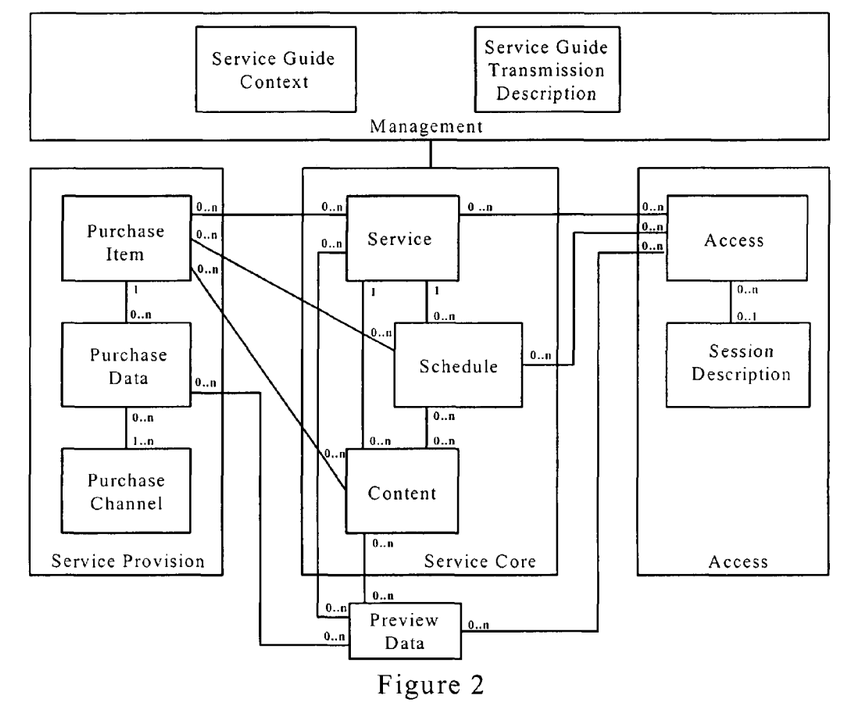
FIG. 2 is a model diagram of the service guide technique in the prior art.

These service layer techniques mainly include implementation methods such as methods of audio and video encoding of channel contents, service guide technique, service and content protection technique, service authentication, user management, and charging, etc. The service guide technique is proposed mainly for eliminating the guide date differences among the existed respective different mobile network hierarchical structures in terms of the transmission channel, contents, and format. With the service guide technique, the user is facilitated to view materials of various services, browse video channels, a program list and price list, select and purchase an item of the list, and log in a website to browse webpage, etc. FIG. 2 shows the schematic model of the service guide technique, in which the Service, Schedule, Access, and Purchase Item, etc. represent a service guide fragment, and the line between them represents a quantitative and reference relationship. For example, as shown in FIG. 2, the relationship between the Service and the Schedule is that one Service fragment can be referenced by 0-n Schedule fragments.

In the service guide technique, the definition of each fragment is shown in Table 1. For simplicity, only part of the fragments related to the present invention is listed.

TABLE 1

| Service guide fragment | Definition |
|---|---|
| Service | Collection of Contents |
| Access | The Access is associated with Session description to indicate the distribution method; in terms of the user terminal, the Access indicates how the user can access and enjoy the program content. |
| Schedule | The Schedule is a schedule for content or service. |
| Content | The Content is the content or program contained in a service. |
| PurchaseItem | The PurchaseItem is the minimum unit of service which can be purchased by the user. |
| ... | ... |

At present, the definition of the PurchaseItem fragment is as shown in Table 2.

TABLE 2

| Name | Type | Category | Cardinality | Description | Data Type |
|---|---|---|---|---|---|
| Purchase Item fragment | E | | 0 ... N | Purchase Item fragment includes the following attributes: id version valid From valid To Weight Closed and includes the following sub-elements: ServiceIdRef ScheduleIDRef ContentIDRef PurchaseItemIDRef Name Description ExtensionURL ParentalRating PurchaseDataIDRef Dependencies Exclusions | |
| id | A | M | 1 | The unique identification of the PurchaseItem fragment | AnyURI |
| ... | ... | ... | ... | ... | ... | wherein E represents an element, A represents an attribute, and M represents mandatory. In Table 2, the attribute "id" of the PurchaseItem fragment, i.e. the identification of the PurchaseItem fragment, is unique identification of the PurchaseItem fragment. This field is generated by the service distribution and adaptation module, adapted to identify the different information fragments in the service guide information, and also serves as the unique identification of the PurchaseItem.

Figure 3:
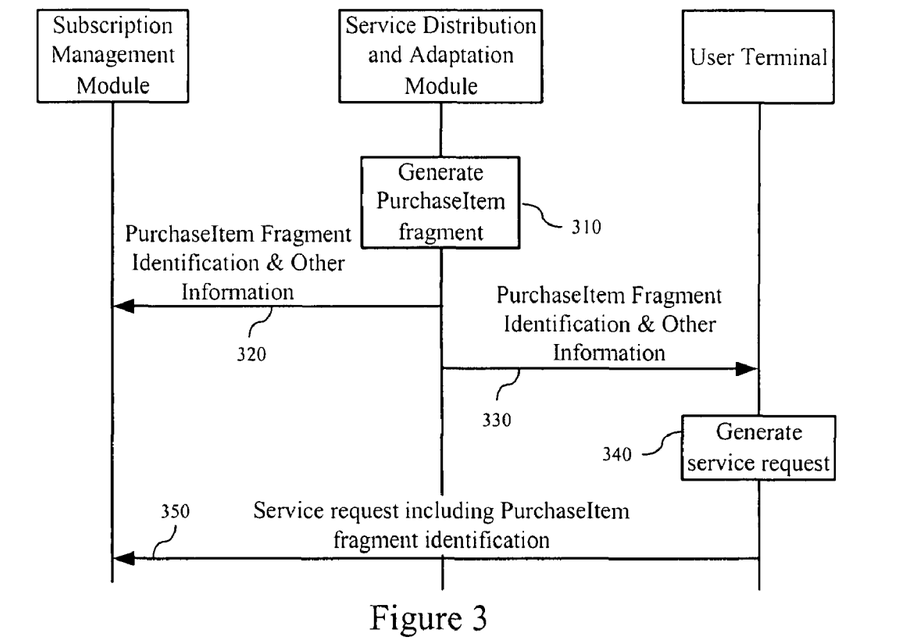
FIG. 3 is a flowchart of subscribing a purchase item in the BCAST in the prior art.

The flow of subscribing a purchase item by a user terminal is shown in FIG. 3. In Block 310, a service distribution and adaptation module generates a PurchaseItem fragment. At 320 and 330, the service distribution and adaptation module sends PurchaseItem fragment identification to a subscription management module, and sends service guide information containing the PurchaseItem fragment to a user terminal. The order of 320 and 330 can be exchanged, or they can be implemented concurrently. In a service management database in the subscription management module, a purchase item is sought and managed based on the PurchaseItem fragment identification. When a user terminal should subscribe for a purchase item, the Block 340 and 350 are implemented, and thus a service request including the PurchaseItem fragment identification which uniquely identifies the purchase item is generated and sent to the subscription management module. The subscription management module searches for the purchase item corresponding to the PurchaseItem fragment identification in the service management database, and accomplishes subscription management for the purchase item according to the PurchaseItem information. The definition of the service request in the prior art includes the contents as shown in Table 3.

TABLE 3

| Name | Type | Category | Cardinality | Description | Data Type |
|---|---|---|---|---|---|
| Purchase Item fragment | E | M | 1 ... N | Item list to be subscribed by user | Complex Type |
| Purchase Item fragment identification | E1 | M | 1 | Uniquely identify the PurchaseItem fragment and PurchaseItem | AnyURI |
| ... | ... | ... | ... | ... | ... |

Figure 4:
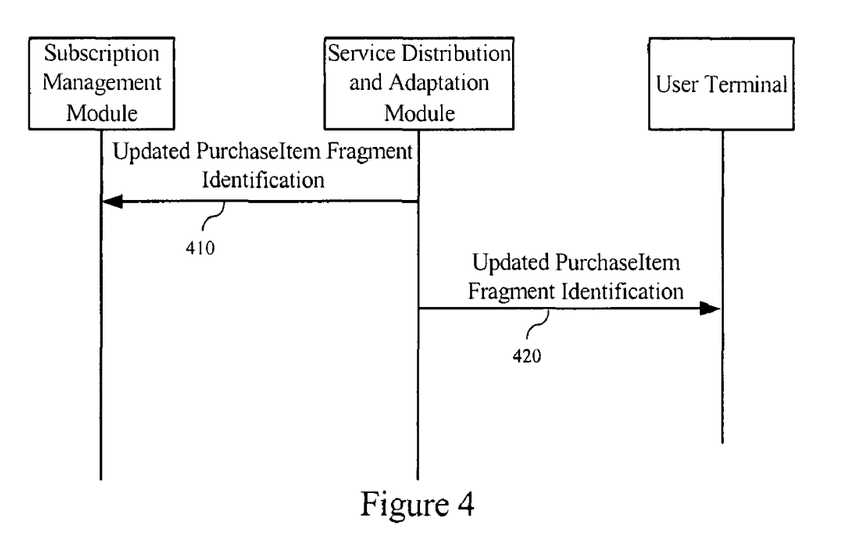
FIG. 4 is a diagram of sending an updated message of PurchaseItem fragment by a service distribution and adaptation module in the prior art.

The function of identifying a purchase item is realized based on a PurchaseItem fragment identification. Therefore, when the PurchaseItem fragment identification is changed randomly or periodically due to network transmission, the service distribution and adaptation module should send an update message to the subscription management module and the user terminal, as shown at 410 and 420 in FIG. 4. The subscription management module should update the PurchaseItem fragment identification in the service management database according to the update message, while the user terminal updates the PurchaseItem fragment identification information in the service guide information according to the update message. Thus, only if the user terminal sends the service request with the updated PurchaseItem fragment identification to the subscription management module, the subscription management module can find out the corresponding purchase item in accordance with the updated PurchaseItem fragment identification to accomplish the subscription normally.

In real applications, the particular purchase item in the PurchaseItem fragment generally would not change, while the PurchaseItem fragment identification often would change randomly or periodically due to network transmission. Therefore, every time the PurchaseItem fragment identification changes, the service distribution and adaptation module should communicate with the subscription management module, thus causing system resources to be largely wasted, and the subscription management module should update the service management database, thus increasing the load of the subscription management module.

SUMMARY OF THE INVENTION

In view of above, an object of embodiments of the present invention is to provide a method and device for subscribing a purchase item in Mobile Broadcast Multicast Service, which simplifies subscribing and updating of the purchase item in BCAST and improves the utilization of system resources.

To achieve the above object, a method for subscribing a purchase item in Mobile Broadcast Multicast Service is provided according to embodiments of the present invention, which includes the following steps of:

sending, by a subscription management module, a PurchaseItem identification uniquely identifying a purchase item to a service distribution and adaptation module;

generating, by the service distribution and adaptation module, a PurchaseItem fragment including the PurchaseItem identification, and sending the PurchaseItem fragment to a user terminal; and reporting, by the user terminal, the PurchaseItem identification of the purchase item to be subscribed for to the subscription management module, and accomplishing, by the subscription management module, the subscription of the purchase item.

A device for subscribing a purchase item in Mobile Broadcast Multicast Service is provided according to embodiments of the present invention, which serves as a subscription management module, and includes an information sending unit, a subscription unit, and a service management database, in which:

the service management database is adapted to store information of a purchase item, including a PurchaseItem identification uniquely identifying the purchase item;

the information sending unit is adapted to send the PurchaseItem identification to a service distribution and adaptation module; and the subscription unit is adapted to receive and manage the request of subscription service, including accomplishing the subscription of the purchase item according to the PurchaseItem identification in service request of the user terminal.

A device for subscribing a purchase item in Mobile Broadcast Multicast Service is further provided according to embodiments of the present invention, which serves as a service distribution and adaptation module, and includes an information receiving unit, a fragment generating unit, and a sending unit, in which:

the information receiving unit is adapted to receive a PurchaseItem identification from a subscription management module;

the fragment generating unit is adapted to generate a PurchaseItem fragment including the PurchaseItem identification; and the Sending unit is adapted to send information, including sending the generated PurchaseItem fragment to a user terminal, the PurchaseItem identification in the PurchaseItem fragment serving as a unique identification of the purchase item subscribed by the user terminal.

A device for subscribing a purchase item in Mobile Broadcast Multicast Service is further provided according to embodiments of the present invention, which serves as a user terminal, and includes a receiving unit and a service management and request unit, in which:

the receiving unit is adapted to receive information, including receiving from a service distribution and adaptation module a PurchaseItem fragment including a PurchaseItem identification uniquely identifying a purchase item; and P the service management and request unit is adapted to subscribe for the purchase item with the PurchaseItem identification from a subscription management module.

In embodiments of the present invention, the PurchaseItem identification separated from the PurchaseItem fragment identification is used to be a symbol to identify the purchase item by the user terminal and the subscription management module. Separating the function of identifying the purchase item from the PurchaseItem fragment identification greatly reduces the coupling degree between the PurchaseItem fragment identification and the purchase item. Thus, when the PurchaseItem fragment identification changes randomly or periodically, the subscription management module neither should receive the updated PurchaseItem fragment identification from the service distribution and adaptation module, nor should update the service management database correspondingly, so that the communication between modules is decreased, and the operating frequency of the database of the subscription management module is lowered. This simplifies the subscription operation of the purchase item, and improves the utilization of system resources.

DETAILED DESCRIPTION OF THE INVENTION

In the prior art, after receiving service request from a user terminal, a subscription management module searches for a purchase item according to a PurchaseItem fragment identification in the service request, and accomplishes subscription. In other words, among a service distribution and adaptation module, the subscription management module, and the user terminal, the function of identifying a purchase item is realized by the PurchaseItem fragment identification. Therefore, as long as the PurchaseItem fragment identification changes, even if the particular purchase item in a PurchaseItem fragment does not change, the service distribution and adaptation module has to send an updated message of the PurchaseItem fragment identification to the subscription management module. The subscription management module then updates the PurchaseItem fragment identification corresponding to the purchase item in a service management database according to the updated message. Thus the subscription management module can find out the suitable purchase item according to the PurchaseItem fragment identification in the service request, accomplishing the subscription. But in fact, it is only required that a same purchase item can be identified by a certain identification between the subscription management module and the user terminal, and it is not necessary that the identification is changed periodically or according to conditions of network transmission.

In embodiments of the present invention, the function of identifying a purchase item is separated from a PurchaseItem fragment identification through replacing the PurchaseItem fragment identification with a PurchaseItem identification to uniquely identify the purchase item, thus largely decreasing coupling degree between the PurchaseItem fragment identification and the purchase item. After a subscription management module sends the PurchaseItem identification to a service distribution and adaptation module, the service distribution and adaptation module generates a PurchaseItem fragment including the PurchaseItem identification, and sends the PurchaseItem fragment to a user terminal. The user terminal reports the PurchaseItem identification of the purchase item to be subscribed in the PurchaseItem fragment to the subscription management module, and the subscription management module accomplishes subscription of the purchase item which the identification is unique based on the PurchaseItem identification. If the PurchaseItem fragment identification changes, the service distribution and adaptation module only should send the PurchaseItem fragment identification and/or the PurchaseItem fragment to the user terminal. The user terminal then updates the PurchaseItem fragment and the PurchaseItem fragment identification based on the information received.

Hereinafter, embodiments of the present invention will be further described in detail with reference to the accompanied drawings to make the objects, technical solutions and advantages of the present invention more apparent.

Figure 5:
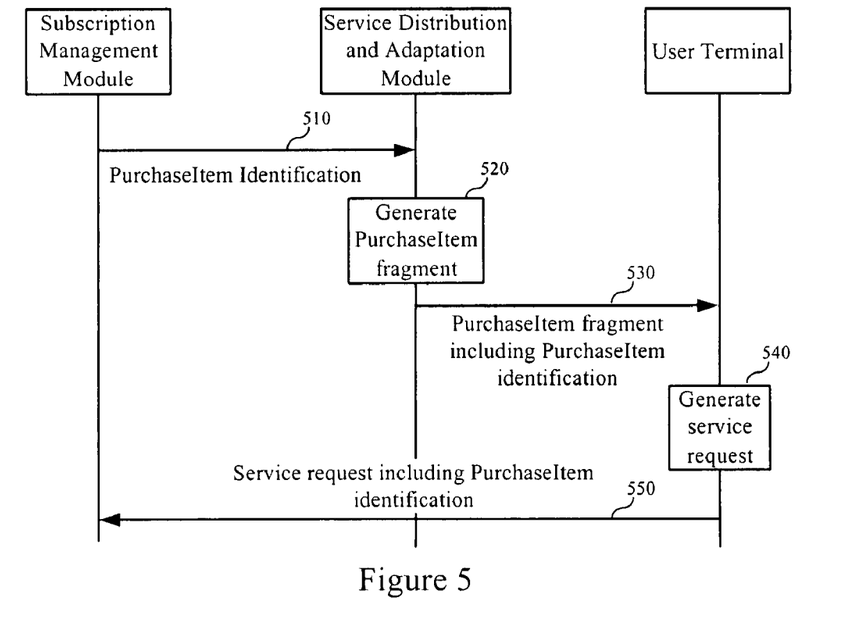
FIG. 5 is a flowchart of a method for subscribing a purchase item in Mobile Broadcast Multicast service according to a first embodiment of the present invention.

The flow of a method for subscribing a purchase item according to a first embodiment of the present invention is shown in FIG. 5. At 510, a subscription management module sends a PurchaseItem identification for uniquely identifying a purchase item to a service distribution and adaptation module. In the prior art, only a PurchaseItem fragment identification can uniquely identify the purchase item. However, at 510, the function of identifying uniquely the purchase item is separated from the PurchaseItem fragment identification through sending, by the subscription management module, the PurchaseItem identification to the service distribution and adaptation module, thus decreasing the coupling degree between the purchase item and the PurchaseItem fragment identification.

In this embodiment, the PurchaseItem identification may be generated by the subscription management module, and stored in a service management database in the subscription management module. Other information such as service information of the purchase item and user subscription information is also stored in the service management database, wherein the service information indicates information relevant to the purchase item, and the user subscription information indicates which purchase item the user has subscribed for and the related subscription information. Of course, the subscription management module also should send other information relevant to the service guide to the service distribution and adaptation module, so that the service distribution and adaptation module can generate service guide fragments.

In Block 520, the service distribution and adaptation module generates the PurchaseItem fragment. In particular, the service distribution and adaptation module receives information relevant to the service guide from respective module including the subscription management module, and generates fragments including PurchaseItem fragments according to the information relevant to the service guide. When a PurchaseItem fragment is generated, the PurchaseItem identification received from the subscription management module by the service distribution and adaptation module is added into the PurchaseItem fragment, so that the PurchaseItem fragment generated by the service distribution and adaptation module includes the PurchaseItem identification. The PurchaseItem fragment including the PurchaseItem identification is shown in Table 4.

TABLE 4

| Name | Type | Category | Cardinality | Description | Data Type |
|---|---|---|---|---|---|
| Purchase Item fragment | E | | 1 ... N | Purchase Item fragment includes the following attributes:<br>id<br>version<br>validFrom<br>validTo<br>Weight<br>Closed<br>and includes the following sub-elements:<br>ServiceIDRef<br>ScheduleIDRef<br>ContentIDRef<br>PurchaseItemIDRef<br>Name<br>Description<br>ExtensionURL<br>ParentalRating<br>PurchaseDataIDRef<br>Dependencies<br>Exclusions | |
| id | A | M | 1 | Unique identification of the PurchaseItem fragment | AnyURI |
| GlobalPurchaseItemID | E1 or A | NM/TM | 1 | The globally unique identifier identifying the purchase item described by this fragment. | AnyURI |
| ... | ... | ... | ... | ... | ... |

Wherein, E represents an element, A represents an attribute, M represents mandatory, and NM/TM represents the network is mandatory/the terminal is mandatory. It should be pointed out that the PurchaseItem identification added in the PurchaseItem fragment is used for uniquely identifying the purchase item. Therefore, the PurchaseItem identification may be included in the PurchaseItem fragment serving as either a newly added attribute or a newly added sub-element.

In block 530, the service distribution and adaptation module sends the PurchaseItem fragment to the user terminal. In other words, the service distribution and adaptation module sends the PurchaseItem fragment including the PurchaseItem identification to the user terminal.

In Block 540, the user terminal generates a service request. In particular, after the user terminal receives the PurchaseItem fragment from the service distribution and adaptation module, the user determines the purchase item. Since the PurchaseItem identification uniquely identifying the purchase item is an attribute or sub-element in the PurchaseItem fragment, the user terminal may determine the PurchaseItem identification to be subscribed based on the purchase item selected by the user, and generate the service request including the PurchaseItem identification. The purchase item information included in the service request generated by the user terminal is shown in Table 5.

TABLE 5

| Name | Type | Category | Cardinality | Description | Data Type |
|---|---|---|---|---|---|
| Purchase Item fragment | E | M | 1 ... N | Item list to be subscribed by user | Complex type |
| Global Purchase Item ID | E1 or A | M | 1 | Global unique identification of the purchase item is advertised in the PurchaseItem fragment of the Service Guide | AnyURI |
| ... | ... | ... | ... | ... | ... |

In contrast with the prior art, the PurchaseItem identification replaces the original PurchaseItem fragment identification in the service request generated by the user terminal to uniquely identify the purchase item.

Then, it proceeds to 550, at which the user terminal sends the service request to the subscription management module, and the subscription of the purchase item is accomplished by the subscription management module. In particular, the user terminal reports the PurchaseItem identification to the subscription management module through sending the service request including the PurchaseItem identification to the subscription management module. The subscription management module searches for information corresponding to the PurchaseItem identification in the service management database, thus accomplishes the subscription of the uniquely identified purchase item. After accomplishing the subscription of the purchase item, the subscription management module manages the user subscription information of the purchase item based on the PurchaseItem identification.

In this embodiment, the subscription management module accomplishes the subscription of the purchase item directly through the PurchaseItem identification included in the service request sent from the user terminal without searching for the corresponding purchase item based on the PurchaseItem fragment identification, thus simplifying the subscription operation of the purchase item.

Figure 6:
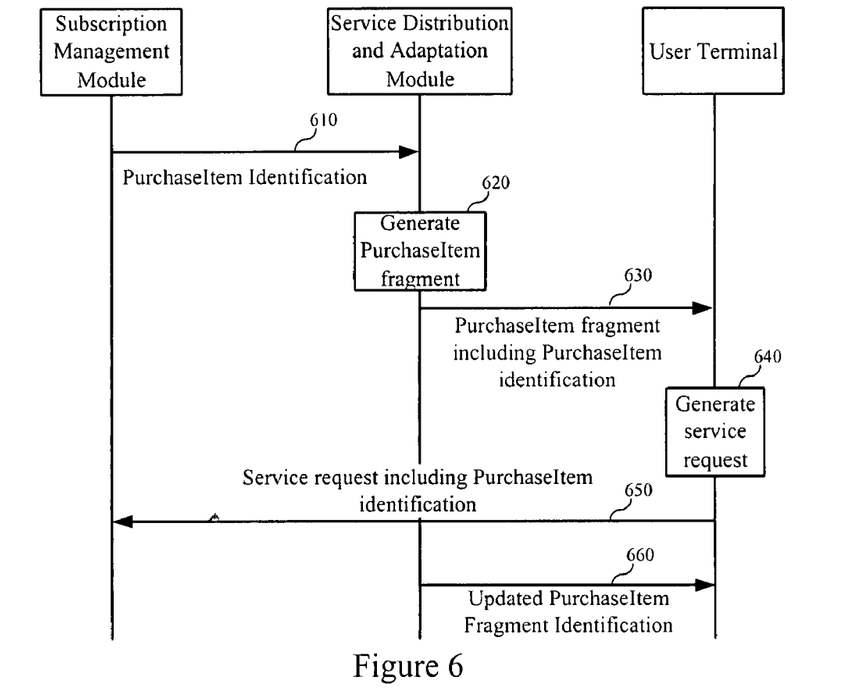
FIG. 6 is a flowchart of a method for subscribing a purchase item in Mobile Broadcast Multicast service according to a second embodiment of the present invention.

The flow of a method for subscribing a purchase item according to a second embodiment of the present invention is shown in FIG. 6. This embodiment differs from the first embodiment in that, the change of the PurchaseItem fragment identification is taken into consideration in this embodiment. 610 to 650 which correspond to 510 to 550 will not be described again here.

When the PurchaseItem fragment identification in the service distribution and adaptation module changes, it will perform Block 660, the service distribution and adaptation module sends the PurchaseItem fragment identification updated and/or the PurchaseItem fragment to the user terminal, and the user terminal then updates the PurchaseItem fragment identification information in the PurchaseItem fragment according to the received information. In other words, when the PurchaseItem fragment identification changes randomly or periodically due to network transmission and the particular purchase item in the PurchaseItem fragment does not change, the service distribution and adaptation module should send the updated PurchaseItem fragment identification and/or the PurchaseItem fragment only to the user terminal, and the PurchaseItem identification in the PurchaseItem fragment will not change. It is not necessary for the service distribution and adaptation module to send the PurchaseItem fragment identification updated to the subscription management module, and information in the database in the subscription management module needs not to be updated. It is to be illustrated that, for the convenience of describing, in the embodiment, 660 follows 650. In fact, 660 will be implemented as long as the PurchaseItem fragment identification changes, and does not necessarily follow 650.

In the method for subscribing a purchase item according to the first and the second embodiments of the present invention, when the service information of the purchase item in the subscription management module changes and the purchase item per se does not change, the updated service information can be sent to the service distribution and adaptation module by the subscription management module, and the PurchaseItem identification does not change. The service distribution and adaptation module generates and sends a new version of the PurchaseItem fragment including new service information and the PurchaseItem identification to the user terminal. In the new version of the PurchaseItem fragment, the PurchaseItem fragment identification may not change, but version information of the PurchaseItem fragment will be updated. The user terminal updates information relevant to the purchase item stored locally according to the received PurchaseItem fragment identification and the version information.

The subscription management module may send the PurchaseItem identification and/or the relevant service information to the service distribution and adaptation module, when the purchase item or the service information of the purchase item in the service management database changes. Optionally, the subscription management module may also make updating periodically. In other words, the subscription management module may send periodically the present PurchaseItem identification and/or the relevant service information in the service management database to the service distribution and adaptation module. Of course, it is also possible that after receiving a request issued actively by the service distribution and adaptation module, the subscription management module sends the requested PurchaseItem identification and/or the relevant service information to the service distribution and adaptation module.

A computer program corresponding to the method according to embodiments of the present invention can be stored in a readable storage medium, in which data can be accessed in forms of optical, electromagnetic, semiconductor or the like.

Figure 7:
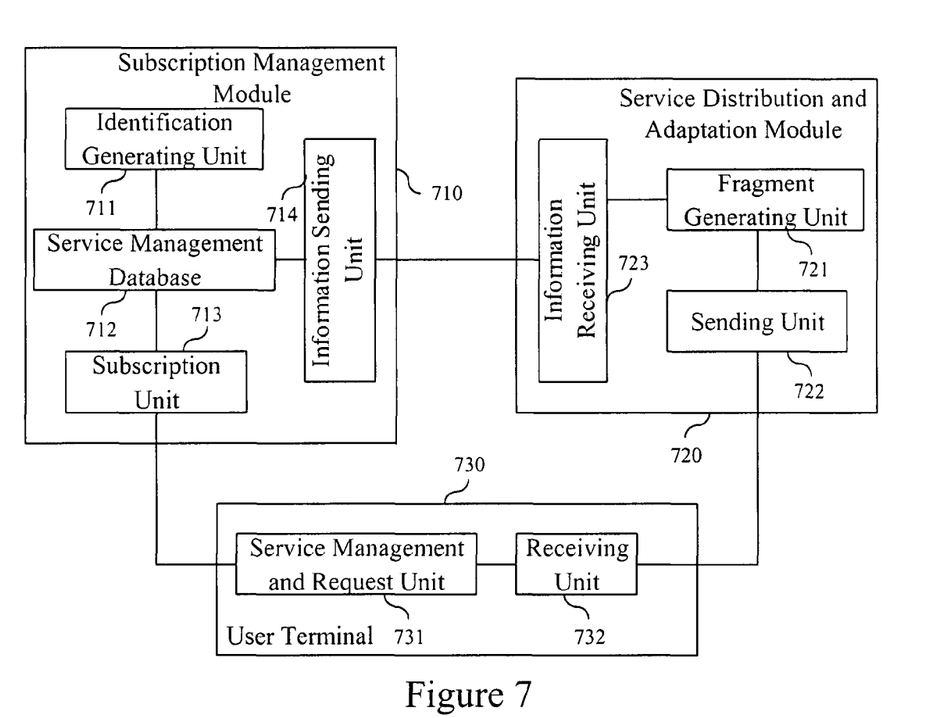
FIG. 7 is a structural diagram of a system for subscribing a purchase item according to an embodiment of the present invention.

FIG. 7 shows a structural diagram of a system for subscribing a purchase item according to embodiments of the present invention, in which the system includes a subscription management module 710, a service distribution and adaptation module 720, and a user terminal 730.

In the subscription management module 710, information of the purchase item, which includes a PurchaseItem identification uniquely identifying the purchase item, and which may further include service information of the purchase item, user subscription information, etc. is stored in a service management database 712. The subscription management module 710 may include an identification generating unit 711, adapted to generate the PurchaseItem identification one-toone corresponding to the purchase item, and to store the relationship between the PurchaseItem identification and the purchase item in the service management database 712. An information sending unit 714 is adapted to send the PurchaseItem identification and/or the relevant service information to the service distribution and adaptation module 720.

The service distribution and adaptation module 720 includes a fragment generating unit 721, a sending unit 722 and an information receiving unit 723. The information receiving unit 723 receives the PurchaseItem identification and/or the relevant service information from the information sending unit 714 of the subscription management module 710, and sends the PurchaseItem identification and/or the relevant service information to the fragment generating unit 721. The fragment generating unit 721 generates a PurchaseItem fragment including the PurchaseItem fragment identification. When the PurchaseItem fragment identification changes periodically or according to conditions of network transmission, or the PurchaseItem information changes, the fragment generating unit 721 generates an updated PurchaseItem fragment identification and/or PurchaseItem fragment. The PurchaseItem fragment identification and/or PurchaseItem fragment generated by the fragment generating unit 721 is sent to the user terminal 730 by the sending unit 722. The PurchaseItem identification contained in the PurchaseItem fragment is used as a unique identification of the purchase item subscribed by the user terminal 730. The sending unit 722 only sends the updated PurchaseItem fragment identification to the user terminal 730, and does not send the updated information to the subscription management module 710.

The user terminal 730 includes a service management and request unit 731 and a receiving unit 732. After receiving the PurchaseItem fragment from the sending unit 722 in the service distribution and adaptation module 720, the receiving unit 732 obtains the PurchaseItem identification uniquely identifying the purchase item from the received PurchaseItem fragment, and outputs the obtained PurchaseItem identification to the service management and request unit 731. After the user makes a decision on the subscription of the purchase item, the service management and request unit 731 sends the service request including the corresponding PurchaseItem identification to the subscription management module 710.

After receiving the service request of the user terminal 730, a subscription unit 713 of the subscription management module 710 determines the purchase item to be subscribed by the user according to the PurchaseItem identification in the service request from the user terminal 730, thus accomplishing the subscription of the purchase item. Hereafter, the subscription unit 713 can further update the user subscription information of the purchase item in the service management database 712.

It can easily be seen that, in the above embodiments of the present invention, the function of identifying the purchase item is separated from the PurchaseItem fragment identification. Therefore, when the PurchaseItem fragment identification changes, the service distribution and adaptation module only should send the updated PurchaseItem fragment identification to the user terminal, and no longer should inform the subscription management module, thus largely decreasing communication between the service distribution and adaptation module and the subscription management module. Meanwhile, it is not necessary to update the database information in the subscription management module when the PurchaseItem fragment identification changes. Therefore, load of service of the subscription management module also decreases, and thus the utilization of system resources is largely improved.

Although the present invention has been illustrated and described with reference to some preferred embodiments of the present invention, it is understood by those ordinary skilled in the art that various changes in the form and in the detail of the present invention can be made without departing from the spirit and scope of the present invention.

What is claimed is:

1. A method for subscribing a purchase item in Mobile Broadcast Multicast Service, the method comprising:
   generating, by a subscription management module, a PurchaseItem identification uniquely identifying the purchase item;
   sending, by the subscription management module, the PurchaseItem identification to a service distribution and adaptation module;
   generating, by the service distribution and adaptation module, a PurchaseItem fragment including the PurchaseItem identification and a PurchaseItem fragment identification, and sending the PurchaseItem fragment to a user terminal; and
   receiving, by the subscription management module, the PurchaseItem identification of the purchase item to be subscribed for, which is reported by the user terminal, and accomplishing, by the subscription management module, the subscription of the purchase item;
   changing, by the service distribution and adaptation module, the PurchaseItem fragment identification, wherein the purchase item corresponding to the PurchaseItem fragment does not change;
   in response to the changing, sending, by the service distribution and adaption module, the changed PurchaseItem fragment identification or the PurchaseItem fragment, including the changed PurchaseItem fragment identification only to the user terminal,
      wherein the PurchaseItem identification in the PurchaseItem fragment does not change and the service distribution and adaption module does not send the changed PurchaseItem fragment identification to the subscription module; and
   updating, by the user terminal, the PurchaseItem fragment or the PurchaseItem fragment identification, the update corresponding to the changed PurchaseItem fragment identification.

2. The method for subscribing a purchase item in Mobile Broadcast Multicast Service according to claim 1, further comprising:
   managing, by the subscription management module, user subscription information of the purchase item based on the PurchaseItem identification.

3. The method for subscribing a purchase item in Mobile Broadcast Multicast Service according to claim 1, wherein the user terminal reports the PurchaseItem identification to the subscription management module via a service request including the PurchaseItem identification.

4. The method for subscribing a purchase item in Mobile Broadcast Multicast Service according to claim 1, wherein the subscription management module sends the PurchaseItem identification to the service distribution and adaptation module when the purchase item changes, or the subscription management module sends the PurchaseItem identification to the service distribution and adaptation module periodically.

5. A system for subscribing a purchase item in Mobile Broadcast Multicast Service, comprising:

a subscription management module;
a service distribution and adaption module;
and a user terminal;
wherein the subscription management module comprises:
an identification generating unit, adapted to generate a PurchaseItem identification on-to-one corresponding to a purchase item, and storing the PurchaseItem identification in a service management database;
the service management database, adapted to store information of the purchase item comprising the PurchaseItem identification uniquely identifying the purchase item;
an information sending unit, adapted to send the PurchaseItem identification and/or the relevant service information to a service distribution and adaptation module; and
a subscription unit, adapted to receive and manage a service request, including accomplishing the subscription of the purchase item based on the PurchaseItem identification in the service request from a user terminal;
wherein the service distribution and adaption module comprises:
an information receiving unit, adapted to receive a PurchaseItem identification or relevant service information;
a fragment generating unit, adapted to generate a PurchaseItem fragment including the PurchaseItem identification and a PurchaseItem fragment identification, and adapted to change the PurchaseItem fragment identification, without changing the purchase item corresponding to the PurchaseItem fragment; and
a sending unit adapted to:
send the PurchaseItem fragment generated by the fragment generating unit to the user terminal, the PurchaseItem identification in the PurchaseItem fragment being usable as a unique identification of the purchase item subscribed by the user terminal, and
send the changed PurchaseItem fragment identification or the PurchaseItem fragment including the changed PurchaseItem fragment identification only to the user terminal and not to the subscription module;
wherein the user terminal comprises:
a receiving unit, adapted to receive a PurchaseItem fragment including a PurchaseItem identification uniquely identifying the purchase item; and
a service management and request unit, adapted to subscribe for the purchase item with the PurchaseItem identification to a subscription management module,
wherein the user terminal is further adapted to update the PurchaseItem fragment or the PurchaseItem fragment identification, the update corresponding to the changed PurchaseItem fragment identification.

6. The system for subscribing a purchase item in Mobile Broadcast Multicast Service according to claim 5, wherein the information of the purchase item in the service management database further comprises user subscription information of the purchase item; and
the subscription unit updates the user subscription information of the purchase item in response to accomplishing the subscription of the purchase item.

* * * * *